United States Patent
Sykora et al.

(10) Patent No.: US 8,203,442 B2
(45) Date of Patent: Jun. 19, 2012

(54) MOTOR VEHICLE

(75) Inventors: Thomas Sykora, Munich (DE);
Andreas Bonfert, Munich (DE);
Andreas Heitz, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 555 days.

(21) Appl. No.: 12/486,203

(22) Filed: Jun. 17, 2009

(65) Prior Publication Data
US 2009/0315695 A1 Dec. 24, 2009

(30) Foreign Application Priority Data
Jun. 18, 2008 (DE) .................. 10 2008 028 975

(51) Int. Cl.
*B60Q 1/00* (2006.01)
*G08B 1/08* (2006.01)
*H04B 1/38* (2006.01)

(52) U.S. Cl. .................. 340/438; 340/425.5; 340/539.1; 455/412.1; 455/554.2; 455/557; 455/569.2

(58) Field of Classification Search .................. 340/438
See application file for complete search history.

(56) References Cited

U.S. PATENT DOCUMENTS

| | | | |
|---|---|---|---|
| 6,917,800 B1 * | 7/2005 | Rychlak | 455/418 |
| 7,200,409 B1 * | 4/2007 | Ichikawa et al. | 455/456.1 |
| 7,689,254 B2 * | 3/2010 | Tanneberger et al. | 455/569.1 |
| 2003/0003892 A1 * | 1/2003 | Makinen | 455/345 |
| 2003/0228879 A1 | 12/2003 | Witkowski et al. | |

FOREIGN PATENT DOCUMENTS
EP 1 628 435 A1 2/2006

OTHER PUBLICATIONS

Bluetooth Sig, Inc:Bluetooth Specification, Version 2.1 + EDR (vol. 3), Jul. 26, 2007. URL:http://www.bluetooth.com/English/Technology/Building/Pages/Specification.aspx (recherchiert am Oct. 29, 2010) ges. Dok., insb. vol. 3, part B, Service Discovery Protocol(SDP), s. pp. 111-168 (30 pages total).
German Search Report dated Dec. 8, 2010 with partial English translation (nine (9) pages).

\* cited by examiner

*Primary Examiner* — Donnie Crosland
(74) *Attorney, Agent, or Firm* — Crowell & Moring LLP

(57) ABSTRACT

A motor vehicle is provided having a wireless interface to a mobile terminal, a storage unit in which information about vehicle functions is stored, and a control unit, which is set up such that information about terminal functions is transmitted from the terminal to the control unit via the wireless interface. The information about vehicle functions is compared to the information about terminal functions, and information about corresponding vehicle functions and terminal functions is stored in the storage unit.

17 Claims, 1 Drawing Sheet

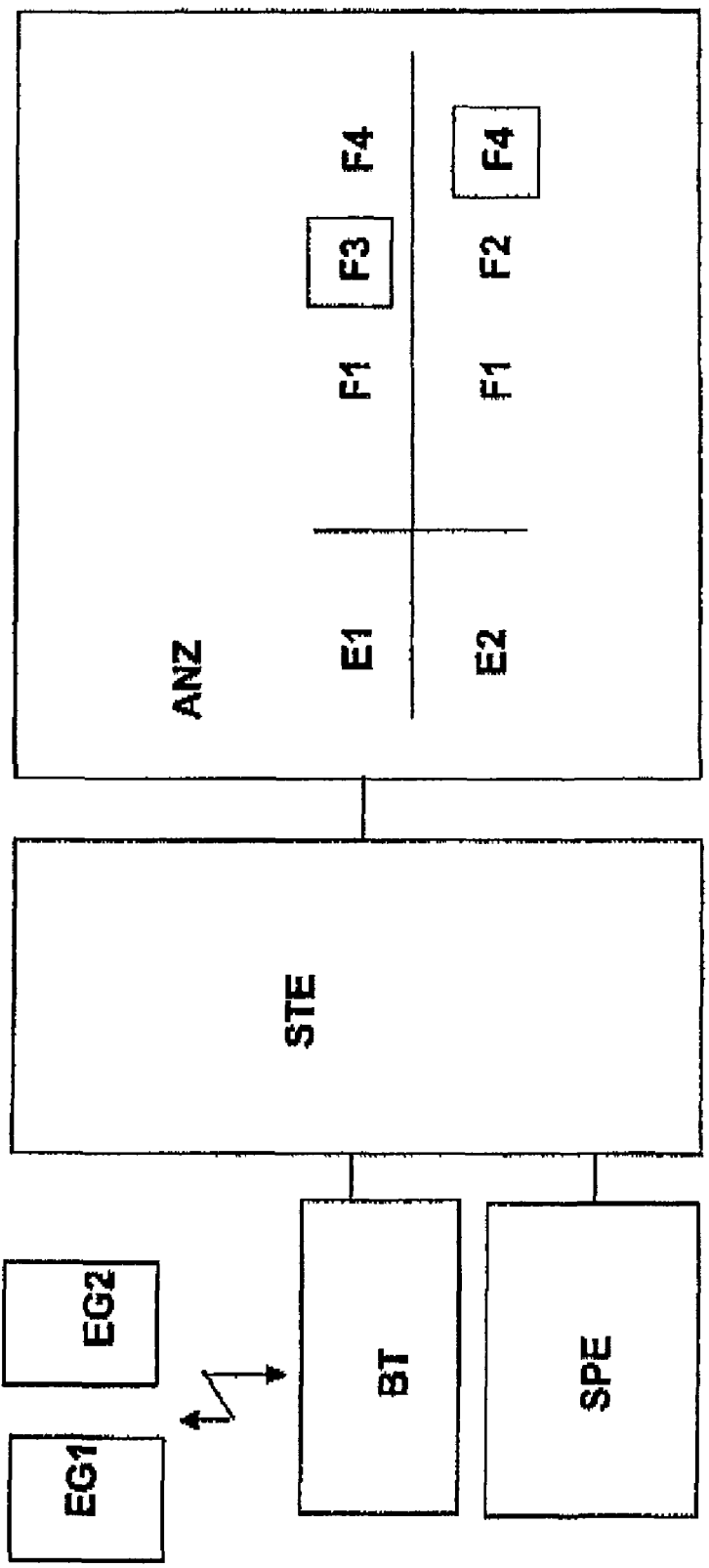

MOTOR VEHICLE

CROSS-REFERENCE TO RELATED APPLICATION

This application claims priority under 35 U.S.C. §119 to German Patent Application No. 10 2008 028 975.2, filed Jun. 18, 2008, the entire disclosure of which is herein expressly incorporated by reference.

BACKGROUND AND SUMMARY OF THE INVENTION

The invention relates to a motor vehicle.

The number of different functionalities in mobile telephones, which are connectable via Bluetooth to a hands-free speech unit of a motor vehicle, will increase rapidly in the coming years. Up to this point, motor vehicle hands-free speech units have primarily been used for connecting mobile telephones, in order to ensure the functionality of "telephoning" or "calling". In addition, the function of "displaying telephone books of the mobile telephone in the passenger compartment" has been implemented in a subset of hands-free speech units available on the market. The operability of this function (telephone book download) is typically not implemented by standardized Bluetooth commands, but rather by proprietary Bluetooth commands.

Future mobile terminals will offer, in addition to the telephony function, a plurality of further functions (audio streaming, data transmission, SMS download, etc.), which may be used by the motor vehicle via a Bluetooth coupling.

The Bluetooth hardware and the Bluetooth stack associated therewith will allow more than one terminal to be connected to the motor vehicle simultaneously (point-to-multipoint, referred to hereafter as PTMP). Completely new customer applications thus result for the vehicle, for example, telephoning via a mobile terminal via the loudspeaker of the vehicle, while audio data are transmitted to the vehicle via a second connected mobile terminal, which may be heard by a backseat passenger via headphones.

The invention seeks to provide a motor vehicle which is practicably connectable to at least one terminal.

This is accomplished according to the invention by providing a motor vehicle having a wireless interface to a mobile terminal, a storage unit, in which information about vehicle functions is stored, and a control unit, which is set up in such a way that: (i) information about terminal functions is transmitted via the wireless interface from the terminal to the control unit; (ii) the information about vehicle functions is compared to the information about terminal functions; and (iii) information about corresponding vehicle functions and terminal functions is stored in the storage unit. Advantageous refinements of the invention are described herein.

A motor vehicle according to the invention includes a wireless interface unit, in particular according to the Bluetooth protocol known per se, for information exchange with a mobile terminal.

Advantageously, multiple terminals, which may each execute a plurality of different functions, may particularly be coupled or connected simultaneously to the motor vehicle via the wireless interface unit. A terminal may be a mobile telephone, a portable computer or PDA, or a portable entertainment device, for example.

In addition, a storage unit is provided, in which information about vehicle functions, in particular about vehicle functions which each support the use of a terminal function in or by the motor vehicle, are stored, and in which further information is or will be optionally stored. The storage unit may include one or more storage modules, which may each be associated with one or more control units or may be comprised thereby.

A control unit, which may include one or more controllers, is particularly programmed such that information about terminal functions is transmitted via the wireless interface from the terminal to the control unit. The stored information about vehicle functions is compared to the information about terminal functions, and information about corresponding vehicle functions and terminal functions is stored in the storage unit. The control unit, in particular parts of the control unit, may be a component of a vehicle head unit and/or a motor vehicle hands-free speech unit.

Terminal functions include, for example, a hands-free speech function, an audio player function, a short message function, a video function, and/or a data transmission function. The use of, or the access to, the corresponding terminal function is supported or made possible by the motor vehicle by one vehicle function in each case.

Based on the knowledge of the terminal functions, which are supported by both the motor vehicle and also the terminal, a reliable interaction between the motor vehicle and the terminal is achieved by the invention.

A preferred motor vehicle additionally includes a display unit. Based on the information about corresponding vehicle functions and terminal functions, at least one display object, which represents one vehicle function and one corresponding terminal function in each case, is shown on the display unit. For example, a symbol representing a hands-free speech function is displayed after it has been established that the hands-free speech function is supported by both the motor vehicle, in particular the hands-free speech unit of the motor vehicle (as a vehicle function), and also by the terminal (as a terminal function).

A user is thus reliably and easily comprehensibly informed about terminal functions of a terminal which are available to him using the employed motor vehicle.

Preferably, information about the terminal identity is transmitted to the control unit from the terminal via the wireless interface, and the display object shows an associated terminal display object, which represents the information about the terminal identity. Thus, also in the event of simultaneous coupling or connection of the motor vehicle to multiple terminals, an easily comprehensible overview of the coupled or connected terminals and the terminal functions available through each of them may be conveyed.

Preferably, content data (audio data, speech telephony data, short message data, or other useful data) are generated by at least one active terminal function, which is particularly selected or activated via an operating unit of the motor vehicle, and this data is particularly read by a storage unit or received by a receiver unit. The content data are transmitted via the wireless interface, in particular a partial protocol of the wireless interface corresponding to the terminal function, from the terminal to the control unit. The display object representing the active terminal function is then emphasized or highlighted according to a preferred refinement in some unique fashion, in particular, by being shown as marked by a check, bolded, enlarged, lighted, in a different color, in a first position, etc. It is thus easily obvious which terminal function is currently used, in particular by which terminal. For example, the Bluetooth profile HFP (for the functions of telephony or hands-free speech), A2DP or AVRCP (for the function of audio streaming), AVDP (for the function of video), or DUN or PAN (for the function of data transmission) come into consideration as the partial protocol of the Bluetooth protocol. The suitable partial protocol is preferably started before a transmission of the corresponding content data or is used to establish a connection. It is also within the scope of the invention that the display object representing the active terminal function is shown emphasized independently of whether content data is actually generated, read, received, or transmitted, in particular as soon as a partial protocol corresponding to the terminal function allows a transmission of content data, as soon as a corresponding connection is established, or as soon as the corresponding terminal function is activated on the terminal and is connected to the control unit.

The information transmitted about the terminal identity from the terminal to the control unit via the wireless interface is preferably associated with information in particular about the last active terminal function of the corresponding terminal. The information about the terminal identity is stored together with the associated information in particular about the last active terminal function of the corresponding terminal in the storage unit in particular.

After receiving information about the terminal identity, in particular after a connection of the terminal to the motor vehicle (for example after a user has entered the motor vehicle with his terminal), it is preferably checked whether the information about the received terminal identity is stored with associated information, in particular about last active terminal function of the terminal. If such information is stored, then:

(i) the corresponding terminal function and advantageously the corresponding vehicle function are automatically activated, (ii) the content data generated by the terminal function are automatically transmitted via the wireless interface, in particular a partial protocol of the wireless interface corresponding to the terminal function, from the terminal to the control unit, and/or (iii) the display object representing the corresponding terminal function is shown emphasized.

Thus, after the coupling or connection of a terminal to a motor vehicle, an access to a terminal function occurs in a simple and user-friendly way via the motor vehicle, which corresponds with a high probability to the user's desire.

For the case in which multiple—in particular not yet connected—terminals are available simultaneously within the wireless interface range, information is received about multiple terminal identities. In this case, it is checked which terminal identity was last active. It is then checked whether the information about the last active terminal identity is stored with associated information about a last active terminal function. If such information is stored, the corresponding terminal function, and advantageously the corresponding vehicle function, are automatically activated and/or the content data generated by the terminal function are transmitted automatically via the wireless interface, in particular a partial protocol of the wireless interface corresponding to the terminal function, from the terminal to the control unit, and/or the display object representing the corresponding terminal function is shown emphasized.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 shows a simplified schematic partial illustration of an exemplary motor vehicle according to the invention.

DETAILED DESCRIPTION OF THE DRAWING

A wireless interface unit BT, for example, according to the Bluetooth protocol, for information exchange with multiple mobile terminals EG1, EG2 is shown in FIG. 1 as part of a motor vehicle. The mobile terminals EG1, EG2 support various terminal functions.

Information about vehicle functions is stored in a storage unit SPE. This information specifies, in particular, which vehicle functions, which each correspond to one terminal function, are supported by the vehicle, in particular the hands-free speech unit, the head unit, or the entertainment system of the vehicle. For example, information is stored about whether a vehicle function corresponding to the terminal function "hands-free speech" is supported by the vehicle, in particular the hands-free speech unit, the head unit, or the entertainment system of the vehicle, or whether a vehicle function corresponding to the terminal function "audio player" is supported by the vehicle, in particular the hands-free speech unit, the head unit, or the entertainment system of the vehicle.

After or in the course of a connection of the motor vehicle to the mobile terminals EG1, EG2, information about the terminal identity, such as an ID code, is transmitted to the control unit STE via the wireless interface BT. It is checked by the control unit STE whether—associated with this ID code—information already exists about a terminal function to be activated.

If there is not yet any information about a terminal function to be activated, information about terminal functions is first requested from the terminal EG1, EG2 via the wireless interface BT. The stored information about vehicle functions is compared to the information about terminal functions. Finally, information about corresponding vehicle functions and terminal functions is stored in the storage unit SPE. For example, a marker is set at the functions (terminal function and/or corresponding vehicle function) which are supported by the terminal and the motor vehicle.

Based on the information about corresponding vehicle functions and terminal functions, the corresponding display objects F1, F2, F3, F4, which each represent one vehicle function and one corresponding terminal function, are shown on a display unit ANZ associated with the corresponding terminals EG1, EG2.

In this example, four different terminal functions together with associated vehicle functions which support the corresponding terminal functions are assumed. The display object F1 represents the function "hands-free speech," the display object F2 represents the function "short message service," the display object F3 represents the function "data transmission," and the display object F4 represents the function "audio player."

In this example, the functions "hands-free speech," "data transmission," and "audio player" are supported by the terminal EG1 (E1) and the motor vehicle. The functions "hands-free speech," "short message service," and "audio player" are supported by the terminal EG2 (E2) and the motor vehicle. The function "video player" is supported by the terminal EG1, but is not supported by the motor vehicle. The corresponding display object is therefore not shown.

Via an operating unit, the user activates the function "data transmission" on the terminal EG1 and the function "audio player" on the terminal EG2. Content data is received from a storage unit by the terminal EG1 in the context of the function "data transmission" and content data is read from a storage unit by the terminal EG2 in the context of the function "audio player." Based on the partial protocols supporting these functions, in particular profiles of the Bluetooth protocol, content data is then transmitted from the terminals EG1, EG2 to the controller STE. The display object F3, F4 representing the active terminal function is marked. Information about the active terminal function is stored in the storage unit SPE associated with terminal identities. This information also remains stored in the storage unit SPE after a disconnection of the terminals EG1, EG2 from the motor vehicle as information about the last activated terminal function or a terminal function to be activated.

After or in the course of a renewed connection of the motor vehicle to one of the terminals EG1, EG2, information about the terminal identity, such as an ID code, is again transmitted to the control unit STE via the wireless interface BT.

It is again checked by the control unit STE whether information about a terminal function to be activated which is associated with this ID code already exists. If information about a terminal function to be activated exists in the storage unit SPE, information about terminal functions may again be requested from the terminal EG1, EG2 via the wireless interface BT. The information about vehicle functions may again be compared to the information about terminal functions, etc. These last-mentioned steps are left out in one embodiment variant of the invention.

The information existing in the storage unit SPE about a terminal function to be activated is then used to automatically activate the corresponding terminal function (in the example here, "data transmission" on the terminal EG1 and "audio player" on the terminal EG2). The content data generated by the terminal functions are automatically transmitted via the wireless interface, in particular a partial protocol of the wireless interface corresponding to one of the activated terminal functions, from the terminal EG1, EG2 to the control unit STE, and the display object F3, F4 representing the corresponding terminal function is marked.

If multiple coupled terminals are available in the vehicle, the terminal first connected to the vehicle is the one which was last connected to the vehicle. The steps explained above are again performed during this connection.

The invention is explained in greater detail hereafter on the basis of a further example without reference to the figure. The invention includes this embodiment variant both in combination with the embodiment variant just explained on the basis of FIG. 1 and also independently thereof.

During the initial coupling of a terminal to the hands-free speech unit, the hands-free speech unit requests the functions generally supported by the terminal from the terminal and compares them to the capabilities coded in the vehicle. The hands-free speech unit stores the status 1="the functions supported by the coupled terminal which are also supported by the vehicle" for the coupled terminal. This status is transmitted from the hands-free speech unit to the head unit and displayed on the display (in the form of an icon).

The vehicle occupant indicates, using an operating element, to which function the terminal is to be connected. This request is relayed from the head unit to the hands-free speech unit. As soon as the hands-free speech unit has executed the request using Bluetooth, the hands-free speech unit stores the status 2="to which function the terminal is currently connected" for the connected terminal. This status is transmitted from the hands-free speech unit to the head unit and displayed on the display. (Form of the display: the terminal appears in the menu of the particular function, such as telephony, at the first position of all terminals which support this function, and moreover is possibly provided with a checkmark).

If multiple terminals are coupled, the hands-free speech unit maintains the list of coupled terminals (referred to hereafter as a "unit list") in the sequence of the last connected terminal at the first position. The list is sent to the head unit for comparison. Upon changes of the connection statuses, the unit list is independently resorted and maintained by the hands-free speech unit.

After multiple terminals have been coupled (and possibly concurrently connected to various functions), the driver now leaves the vehicle. Upon reentry ("vehicle terminal on"), the hands-free speech unit connects itself again promptly to the particular desired terminals and the desired functions. For this purpose, a status 3 is introduced, which defines the preferred terminal to be connected having the preferred function to be connected. Specifically, the following chronological sequence of statuses occurs:

(1) At moment A: terminal is connected to a function
  status 1=1 (terminal reports that the function is supported by it and by the vehicle)
  status 2=1 (terminal having this function is connected to hands-free speech unit)
(2) At moment B: vehicle is turned off
  status 1=1 (terminal which was coupled supports the function)
  status 2=0 (terminal is longer connected)
  status 3=1 (before status 2 is reset after connection abort, status 3 is activated, in order to also mark the last connected terminal as the terminal preferably to be connected in the next terminal cycle)
(3) At moment C: search phase for reconnection runs, after further "terminal on"
  status 1=1 (terminal which was coupled supports the function)
  status 2=0 (terminal is already no longer connected and not yet reconnected)
  status 3=1 (because this terminal is to be marked as preferably to be connected with the corresponding function)
(4) At moment D: terminal is again connected to the particular function
  status 1=1 (coupled terminal supports the function)
  status 2=1 (terminal is connected again)
  status 3=1 (terminal is marked as the terminal to be connected preferably)

In summary:
a maximum of 3 different statuses are stored for each terminal and each function;
  status 1: is function supported by terminal and vehicle (?);
  status 2: is terminal currently connected to this function (?);
  status 3: is terminal preferably to be connected to this function upon reconnection (?)

These statuses are communicated to the head unit and displayed thereby in various forms. The head unit communicates the connection commands input using an operating element to the hands-free speech unit. The hands-free speech unit executes these commands via Bluetooth and resorts the unit list if needed. The result is again communicated to the head unit.

For example, a motor vehicle may thus recognize after "terminal on" on the basis of the three stored statuses which terminal to search for first and to which function it is to connect this. The motor vehicle does not simply search through a list, but rather specifically for the terminals to be connected according to a predefined logic. This results in the user's desired terminals being reconnected to the desired functions in the shortest time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a wireless interface operatively configured to interface with a mobile terminal;
   a storage unit, in which information about vehicle functions is stored;
   a control unit operatively configured such that:
   (i) information about functions of the mobile terminal is transmitted via the wireless interface from the mobile terminal to the control unit,
   (ii) information about vehicle functions of the vehicle is compared to the information about terminal functions; and
   (iii) information about vehicle functions and terminal functions corresponding to one another is stored in the storage unit.

2. The motor vehicle according to claim 1, further comprising:
   a display unit arranged in the vehicle; and
   wherein, based on the information about corresponding vehicle and terminal functions, at least one display object representative of one corresponding vehicle and terminal function is shown on the display unit.

3. The motor vehicle according to claim 2, wherein information about an identity of the mobile terminal is received by the wireless interface from the mobile terminal and transmitted to the control unit via the wireless interface, and
   wherein the display object on the display unit is shown in association with a terminal display object, representing the information about the terminal identity.

4. The motor vehicle according to claim 2, wherein content data, generated by at least one active terminal function of the mobile terminal, is received by the wireless interface and transmitted via the wireless interface to the control unit, said receipt and transmission occurring via a partial protocol of the wireless interface corresponding to the terminal function; and
   wherein the display object representing the active terminal function is shown on the display unit in a highlighted form.

5. The motor vehicle according to claim 3, wherein content data, generated by at least one active terminal function of the mobile terminal, is received by the wireless interface and transmitted via the wireless interface to the control unit, said receipt and transmission occurring via a partial protocol of the wireless interface corresponding to the terminal function; and
   wherein the display object representing the active terminal function is shown on the display unit in a highlighted form.

6. The motor vehicle according to claim 1, wherein information about a terminal identity is received by the wireless interface from the mobile terminal and transmitted to the control unit via the wireless interface; and
   wherein information about an active terminal function is stored in association with the information about the terminal identity.

7. The motor vehicle according to claim 5, wherein information about the active terminal function is stored in association with the information about the terminal identity.

8. The motor vehicle according to claim 6, wherein:
   after receiving information about the terminal identity, checking whether information about an active terminal function is stored in association with the information about the terminal identity, and, if necessary, carrying out at least one of:
   automatically activating the corresponding terminal function;
   automatically transmitting content data generated by the terminal function to the control unit via the wireless interface; and
   highlighting the display object representing the corresponding terminal function.

9. The motor vehicle according to claim 7, wherein:
   after receiving information about the terminal identity, checking whether information about an active terminal function is stored in association with the information about the terminal identity, and, if necessary, carrying out at least one of:
   automatically activating the corresponding terminal function;
   automatically transmitting content data generated by the terminal function to the control unit via the wireless interface; and
   highlighting the display object representing the corresponding terminal function.

10. The motor vehicle according to claim 7, wherein after receiving information about multiple terminal identities, the control unit checks which terminal identity was last active and whether information information about the last active terminal identity; and, if necessary, carrying out at least one of:
    automatically activating the corresponding terminal function;
    automatically transmitting content data generated by the terminal function via the wireless interface to the control unit; and
    highlighting the display object representing the corresponding terminal function on the display unit.

11. A method of operating a motor vehicle having a wireless interface operably configured to interface with a mobile terminal, and a storage unit in which information about vehicle functions is stored, the method comprising the acts of:
    transmitting information about functions of the mobile terminal to a control unit via the wireless interface;
    comparing information about functions of the vehicle to the transmitted information about the terminal functions; and
    storing in the storage unit information about those vehicle functions and terminal functions that correspond to one another.

12. The method according to claim 11, further comprising the act of displaying a display object representative of a vehicle function and terminal function that correspond to one another based upon the information about the corresponding vehicle and terminal functions on a display unit in the motor vehicle.

13. The method according to claim 12, further comprising the acts of:
    transmitting information about an identity of the mobile terminal to the control unit via the wireless interface; and
    displaying the display object in association with a terminal display object representing the terminal identity information on the display unit.

14. The method according to claim 13, further comprising the acts of:
    receiving content data by the wireless interface, said content data having been generated by at least one active terminal function of the mobile terminal;

transmitting the content data via a partial protocol of the wireless interface corresponding to the terminal function to the control unit; and highlighting the display object representing the active terminal function on the display unit.

15. The method according to claim 14, further comprising the act of storing information about the active terminal function in association with the terminal identity information.

16. The method according to claim 15, wherein:

after receiving the terminal identity information, checking whether information about an active terminal function is stored in association with the terminal identity information; and if needed, performing at least one of the following:

automatically activating the corresponding terminal function;

automatically transmitting content data generated by the terminal function via the wireless interface to the control unit; and highlighting the display object representing the corresponding terminal function on the display unit.

17. The method according to claim 16, wherein:

after receiving information about multiple terminal identities, checking which terminal identity was last active;

checking whether information about an active terminal function is stored in association with the information about the last active terminal identity; and performing at least one of the following if needed:

automatically activating the corresponding terminal function;

automatically transmitting content data generated by the terminal function to the control unit via the wireless interface; and highlighting the display object representing the corresponding terminal function on the display unit.

* * * * *